May 6, 1958   C. J. WHEELER   2,833,034
CUTTER FOR SEVERING CAST IRON PIPE AND THE LIKE
Filed June 11, 1957   2 Sheets-Sheet 1

INVENTOR
CHARLES J. WHEELER

BY  C. T. Cross
ATTORNEY

May 6, 1958

C. J. WHEELER 2,833,034

CUTTER FOR SEVERING CAST IRON PIPE AND THE LIKE

Filed June 11, 1957

INVENTOR

CHARLES J. WHEELER

BY *C.T.Cross*

ATTORNEY

United States Patent Office 2,833,034
Patented May 6, 1958

2,833,034

CUTTER FOR SEVERING CAST IRON PIPE AND THE LIKE

Charles J. Wheeler, Mentor, Ohio, assignor to Wheeler Manufacturing Corporation, Ashtabula, Ohio, a corporation of Ohio Application June 11, 1957, Serial No. 667,732

14 Claims. (Cl. 30—92)

This invention relates to the cutting of hollow articles, and more particularly relates to new and improved apparatus for cutting hollow articles.

This invention is a continuation-in-part of my prior application Serial Number 578,208 filed April 16, 1956 and constitutes an improvement thereon.

Up to the present time, the cutting of hollow articles, especially cylindrical or tubular articles as well as hollow articles of rectangular cross section such as various types of conduits or pipes, notably cast iron pipe, frequently has been a difficult and time-consuming operation. Cast iron pipe is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while undoubtedly affording means of cutting pipe accurately, generally is slow and relatively costly since the saw blade life often is relatively short. Moreover, it will be appreciated that, at times, the use of a power hack saw is either impracticable or impossible. In addition, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

There is described and claimed in my above-mentioned pending application a new and useful cutter employing a stationary cutter chain and a pressure clamp which cutter avoids the difficulties in cutting pipe characterizing prior rotary or oscillatable cutters as well as the problems associated with the use of saws, chisels and metal cutting torches. While the apparatus described and claimed in my prior-mentioned, copending application provides a singular advance over the art, and while perfectly satisfactory operation is obtained if a minimum of care is exercised in positioning the cutter about the work to be cut, it has been found that in certain instances with careless operation of such apparatus at times difficulty was encountered in that the cutter chain beyond that used in cutting became improperly engaged between the pressure clamp jaws. In some instances, where pressure was applied while the cutter chain was thus improperly engaged, the cutters were crushed or deformed. The present invention comprises an improvement on such a cutter which renders it even more advantageous in use and avoids damaging the cutter by improper positioning of the cutter chain between the cutter jaws.

Accordingly, the principal object of this invention is to avoid the difficulties heretofore encountered and to provide a new and improved cutter for pipe or other hollow articles wherein damage to the cutter through careless operation is avoided and adjustment of the cutter chain to cut articles of varying sizes is facilitated.

A further object of the invention is the provision of new and improved apparatus for cutting hollow articles, notably pipe.

These and other objects and advantages of the invention will more fully appear from the following description thereof.

Briefly, the present invention described and claimed in my above-mentioned pending application is based upon the discovery that hollow articles, especially those formed of relatively brittle materials, e. g., cast iron pipe, can readily and accurately be cut by applying substantially uniformly circumferentially distributed, linearly-concentrated, radially-directed, squeeze cut pressure to the article sufficient to effect cutting thereof. The practice of that invention has proved to be especially advantageous with respect to relatively brittle articles such as cast iron pipe, hollow tile, and the like. Surprisingly, cutting properly effected in accordance with my invention does not cause shattering, cracking or other injury to the article being cut. Moreover, it will be appreciated that the practice of my invention does not involve rotation or oscillation of apparatus about the pipe or other article being cut, but, on the contrary, provides a direct, rapid, accurate means of cutting hollow articles formed of cast iron and other materials.

The present invention comprises a cutter for hollow articles having, in combination, a flexible, non-extensible cutter chain adapted to be placed around an article to be cut and to apply linearly-concentrated, circumferentially-uniform, radially-directed, article-cutting pressure thereto without rotation or oscillation thereabout, and a pressure clamp including a first clamp jaw secured to said chain, and a second clamp jaw having chain-engaging means thereon to engage said chain at a point dictated by the size of the article to be cut, at least one of said jaws having an opening therein to receive and guide excess cutter chain away from said chain-engaging means.

By providing an opening in at least one of the jaws, the extra length of cutter chain which otherwise might well be damaged if allowed to be caught between the jaws of the clamp as pressure is applied, is safely and positively guided out of the way. Moreover, by providing, as in a preferred embodiment of the invention, means to engage the chain, while extended into or through the opening, the means being either in the opening itself or adjacent thereto, an even more advantageous result is achieved.

Thus far, it will be appreciated that apparatus of this invention includes a non-extensible cutter chain preferably containing a plurality of spaced, uniformly circumferentially distributed cutter edges, and means to apply radially directed pressure thereto. Generally, this means may comprise a variety of pressure sources including, for example, purely mechanical, electrical or hydraulic devices, or some combination thereof. Hence, it will be understood that different means may be employed to apply pressure to a series of cutter edges linearly disposed around an article to be cut whereby a concentrated, resultant, inwardly radially-directed, article-cutting force is achieved.

At present, it generally is preferred to utilize as this means a pressure clamp adapted to engage the cutter linkage, e. g., with the two jaws of the clamp, and by movement of the jaws to effect the application of tension to said linkage while disposed about the pipe or other article to be cut, thus imparting a concentrated pipe constricting, squeeze cutting pressure sufficient to shear through the pipe wall. A specifically preferred means for applying pressure to the cutter edges is a compound leverage pressure clamp mechanism of the type usually employed in a manually operated bolt cutter. Such a device typically includes two handles which are pivotally connected to each other near one end and each of which pivotally supports an adjustable second pivot arm, each of the second pivot arms in turn, pivotally supporting a third pivot arm. These third pivot arms, each pivotally secured at one end thereof to the second pivot arm are fixedly, yet pivotally, connected to each other intermediate their ends. The free ends of the third pivot arms comprise the jaws of the pressure clamp which, by means of a thus greatly multiplied leverage power, are able to exert tremendous force therebetween.

Reference is now made to the accompanying drawings which illustrate various embodiments of the apparatus of this invention.

Figure 1:
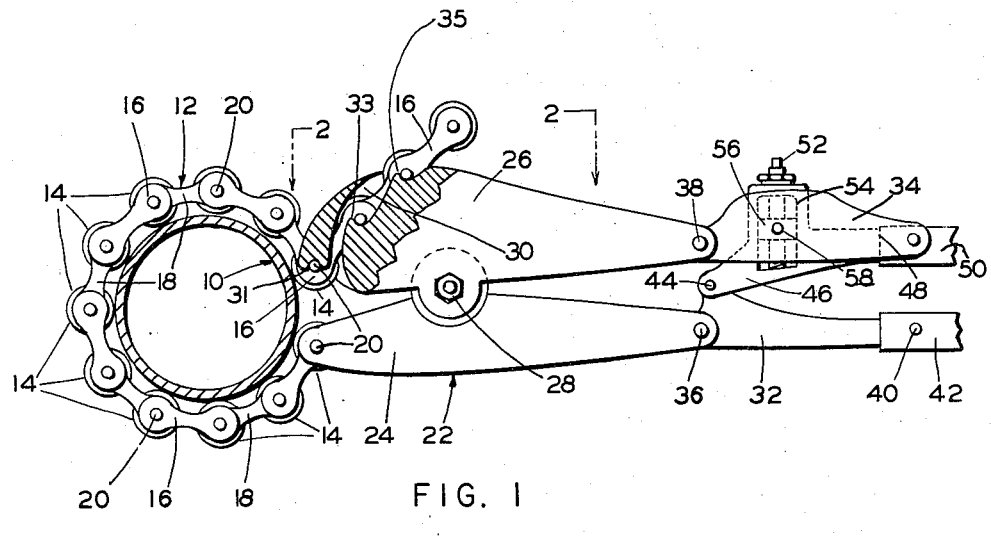
Fig. 1 is a fragmentary view, partially in section, of a cutter embodying the invention.
Figure 2:
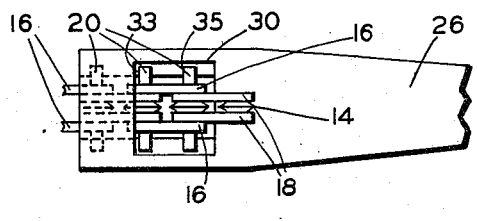
Fig. 2 is a fragmentary view taken along the line 2—2 of Fig. 1.

Referring more particularly to the drawing, in Fig. 1 there is shown a cutter of this invention disposed in operative position about a pipe 10 to be cut. As there shown, the cutter comprises a cutter chain, indicated generally at 12, including a plurality of uniformly-spaced, identical cutting edges or cutters 14, pivotally joined into a flexible, non-extensible chain by a plurality of external links 16 and internal links 18 via identical transverse pins 20 extending through the links 16 and 18 and cutters 14, and projecting on both sides thereof, as shown in Fig. 2. Thus chain 12 is adapted to be tightened around the article 10 to be cut and thereby, without rotation or oscillation thereabout, to apply circumferentially-uniform, radially-directed, article-cutting pressure in response to application of pressure by a pressure clamp, especially a compound leverage pressure clamp designated generally by the numeral 22 in Fig. 1.

Pivotally connected to one end of cutter chain 12 via a pin 20 is a first clamp jaw 24. A second clamp jaw 26, pivotally secured to the first clamp jaw 24 via a common pivot 28 intermediate their ends, is provided with an opening 30, completely enclosed in cross-section, e. g., rectangular in cross-section, therethrough. The opposite ends of the clamp jaws 24 and 26 are pivotally secured to first and second intermediate links 32 and 34, respectively, at pivots 36 and 38. Intermediate link 32 is fixedly secured at 40 to a first handle 42 and pivotally secured at 44 to a third intermediate link 46, which, in turn, is fixedly secured at 48 to a second handle 50. It will be appreciated that the relative positions of points 36 and 38, for a given handle spacing, is adjusted by turning screw 52, which is rotatably secured in a rectangularly-shaped upstanding cutout section 54 of the third intermediate link 46, and threadedly carries a nut 56 secured to second intermediate link 34 via a transverse pin 58.

As shown in Fig. 1, the opening 30 constitutes a means for receiving, guiding, and engaging the excess cutter chain beyond that necessary to cut the article 10, as is dictated by the chain length ending at pin 20 retained in a detent 31 in the forward lip of jaw 26. There are provided, in opening 30, detents 33 and 35 which are spaced laterally a distance to receive therebetween the cutter chain 12 but to retain the pins 20.

Figure 3:
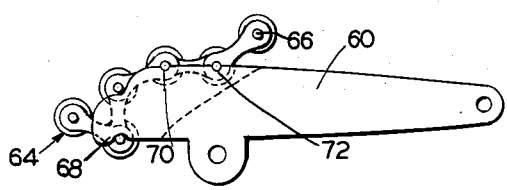
Fig. 3 is a view of a clamp jaw illustrating another embodiment of the invention.
Figure 4:
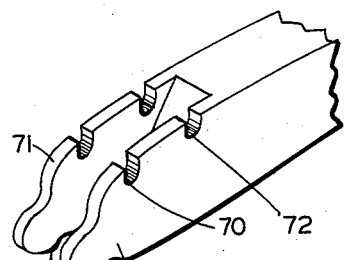
Fig. 4 is a fragmentary perspective view of a portion of a clamp jaw as shown in Fig. 3.

The cutter jaws and jaw elements shown in Figs. 3, 4, 5, 6, 7, 8 and 9 are intended, of course, to be employed in combination with the other apparatus elements as illustrated in Fig. 1. Referring to Figs. 3 and 4 together, it will be seen that the cutter jaw 60, corresponding to jaw 26 in the apparatus of Fig. 1, is provided with an opening 62 defining a U-shaped cross-section as best illustrated in Fig. 4. A cutter chain 64, including transverse pins 66, is engaged by a detent 68 and the excess chain length is disposed through the opening 62 to engage pins 66 in transverse notches 70 and 72. It will be appreciated, of course, that the spacing of blades 71 and 73 is sufficient to permit passage therebetween of the cutter chain but to retain the transverse pins 66.

Figure 5:
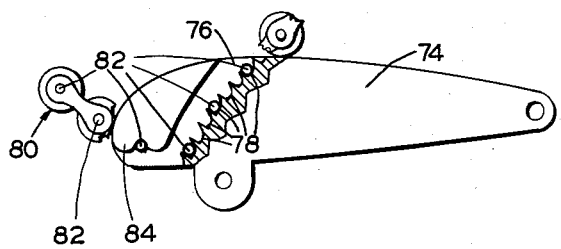
Fig. 5 is a view, partially in section, and with parts broken away for clarity, of another type of clamp jaw embodying the invention.
Figure 6:
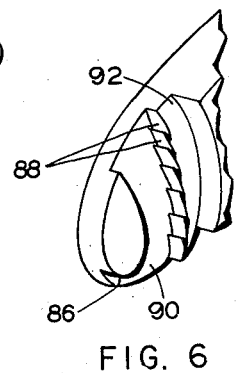
Fig. 6 is an enlarged, fragmentary perspective view of a portion of a jaw of the type shown in Fig. 5.

Fig. 5 illustrates a cutter jaw 74, corresponding to jaw 26 of Fig. 1, wherein an opening 76, rectangular in cross-section, is provided with a plurality of transverse notches 78 spaced closer together than the distance between successive pins 82. In use, a cutter chain 80, all but the transverse pins 82 being omitted for a portion of the illustrated length for clarity, is engaged first by a hook or detent 84 and simultaneously by at least one, preferably two or more, notches 78. Fig. 6 illustrates, in an enlarged perspective view, a portion of a cutter jaw of the general type shown in Fig. 5. As shown in Fig. 6, the first cutter pin to be engaged is not retained by a notch or detent but merely bears against curved surface 86, the chain retention being accomplished by transverse notches 88 outstanding from the wall 90. The notches 88 have therebetween a recessed groove 92 to provide room for the cutters of the chain.

Figure 7:
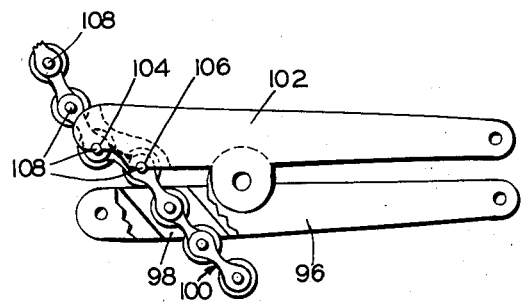
Fig. 7 is a view, with parts broken away for clarity, of a pair of clamp jaws illustrating another embodiment of the invention.

Fig. 7 illustrates another embodiment of the invention wherein a first cutter jaw 96, corresponding to cutter jaw 24 in Fig. 1, is provided with an opening 98 therethrough to receive and guide a cutter chain 100 of the type hereinbefore described. In use, a pivotally connected clamp jaw 102, corresponding to jaw 26 in Fig. 1, is provided with two transverse notches 104 and 106 which engage transverse chain pins 108.

Figure 8:
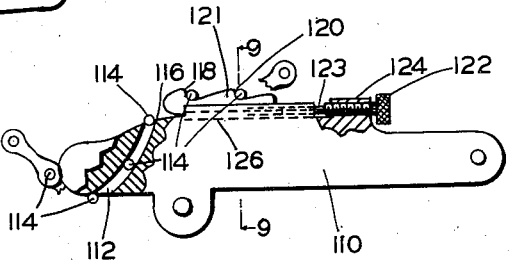
Fig. 8 is a view, partially in section, with parts broken away, illustrating another embodiment of a clamp jaw of this invention.
Figure 9:
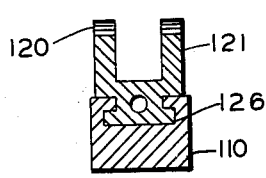
Fig. 9 is a sectional view, with the proportions exaggerated somewhat, taken along the line 9—9 of Fig. 8.

Fig. 8 illustrates still another embodiment of the invention comprising a clamp jaw 110 corresponding to jaw 26 in Fig. 1, provided with an opening 112, terminated laterally in aligned, curved grooves in which transverse pins 114 are engaged. Opening 112 has adjacent its end 116 two slidably-adjustable detents 118 and 120 in a U-shaped support 121 adapted to engage the transverse pins 114 and, by turning knurled (or bolt-shaped) knob 122, connected to a shaft 123, threadedly engaged in a housing 124, and rotatably secured to support 121, to be moved longitudinally along a track 126 as necessary to adjust the initial tension of the cutter chain about the article to be cut. Fig. 9 is a somewhat exaggerated sectional view taken generally along the line 9—9 of Fig. 8 wherein the sliding engagement of support 121 in jaw 110 is shown in some detail.

The various cutters described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter, the particular steel employed in forming the cutters and cutting edges is dictated by a consideration of the hardness, brittleness, availability, etc. The angle included between the surfaces definining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. A cutter for a hollow article which comprises, in combination, a flexible, non-extensible cutter chain adapted to be placed around an article to be cut and to apply linearly-concentrated, circumferentially-uniform, radially-directed, article-cutting pressure thereto without rotation or oscillation thereabout, and a pressure clamp including a first clamp jaw secured to said chain, and a second clamp jaw having chain-engaging means thereon to engage said chain at a point dictated by the size of the article to be cut, at least one of said jaws having an opening therein to receive and guide excess cutter chain away from said chain-engaging means.

2. A cutter as in claim 1 wherein said jaws are pivotally connected intermediate their ends.

3. A cutter as in claim 1 wherein said opening has means therein to engage said chain.

4. A cutter as in claim 1 wherein said opening defines a U-shaped cross section in said jaw.

5. A cutter for a hollow article which comprises, in combination, a cutter chain including a plurality of uniformly-spaced cutting edges joined into a chain by connecting links and transverse connecting pins extending through and projecting from the links and cutting edges, said chain adapted to be placed around an article to be cut and to apply thereto linearly-concentrated, circumferentially-uniform, article-cutting, radially-directed pressure without rotation or oscillation thereabout, and a pressure clamp including a first clamp jaw pivotally secured to said chain and a second clamp jaw connected to said first clamp jaw at a common pivot intermediate their ends, and having a detent thereon to engage said chain via said pins at a point dictated by the size of the article to be cut, said second clamp jaw having an opening therethrough to receive said chain.

6. A cutter as in claim 5 wherein said opening defines a U-shaped cross section in said cutter, the spaced-apart edges of said jaw having at least one transverse detent therein to engage said pins at points on said chain beyond that defining the desired chain length.

7. A cutter as in claim 5 wherein said opening is, at any given cross section, completely enclosed.

8. A cutter as in claim 1 wherein said opening is, at any given cross section, completely enclosed, and is provided with at least one detent to engage said chain when in said opening.

9. A cutter as in claim 1 wherein said opening is in said first clamp jaw.

10. A cutter as in claim 1 wherein at least one adjustably positioned detent and means to adjust said detent are provided on a jaw having said opening therein adapted to receive and engage said chain when extended through said opening.

11. A cutter for a hollow article, which comprises, in combination, a cutter chain adapted to be placed around an article to be cut and to apply thereto linearly-concentrated, circumferentially-uniform, article-cutting, radially-directed pressure without rotation or oscillation thereabout, and a pressure clamp including a first clamp jaw secured to said chain and a second clamp jaw having means thereon to engage said chain at a point dictated by the size of the article to be cut, at least one of said jaws having an opening therethrough to receive and guide excess cutter chain away from the chain-engaging means on said second clamp jaw, said opening having a plurality of detents therein to engage said chain.

12. A cutter as in claim 11 wherein the inner walls of said opening are provided with at least one detent to engage said cutter chain therein.

13. A cutter as in claim 11 wherein said second clamp jaw is U-shaped in cross section for a position of its length and is provided with a plurality of aligned transverse notches across said opening on one side of said jaw.

14. A cutter as in claim 1 wherein there is provided adjacent the end of said opening at least one slidably-adjustable detent movable along a track on said second jaw.

References Cited in the file of this patent

UNITED STATES PATENTS

| | | |
|---|---|---|
| 137,076 | Hill | Mar. 25, 1873 |
| 2,793,433 | Wheeler | May 28, 1957 |